(12) United States Patent
Edmon et al.

(10) Patent No.: US 7,142,649 B2
(45) Date of Patent: *Nov. 28, 2006

(54) DEDICATED DATA MODEM SYSTEM AND METHOD

(75) Inventors: Eugene L. Edmon, Danville, CA (US); Carlton L. Brown, Danville, CA (US); Christopher T. Rice, San Antonio, TX (US)

(73) Assignee: SBC Knowledge Ventures, L.P., Reno, NV (US)

(*) Notice: Subject to any disclaimer, the term of this patent is extended or adjusted under 35 U.S.C. 154(b) by 3 days.

This patent is subject to a terminal disclaimer.

(21) Appl. No.: 10/833,376

(22) Filed: Apr. 28, 2004

(65) Prior Publication Data

US 2004/0213171 A1 Oct. 28, 2004

Related U.S. Application Data

(63) Continuation of application No. 10/176,234, filed on Jun. 20, 2002, now Pat. No. 6,751,304.

(51) Int. Cl.
*H04M 11/00* (2006.01)
(52) U.S. Cl. ................... 379/93.32; 379/93.28
(58) Field of Classification Search ............. 379/93.32, 379/93.28, 90.01, 93.08, 93.31, 93.01; 375/222
See application file for complete search history.

(56) References Cited

U.S. PATENT DOCUMENTS 5,307,402 A * 4/1994 Cooper ................... 379/93.32
6,035,020 A * 3/2000 Weinstein et al. ........ 379/93.09
6,363,079 B1 * 3/2002 Barzegar et al. ............ 370/465
6,751,304 B1 * 6/2004 Edmon et al. ........... 379/93.32

* cited by examiner

Primary Examiner—Stella Woo
(74) Attorney, Agent, or Firm—Toler Schaffer, LLP

(57) ABSTRACT

A data modem aggregator system and a method of initializing a data modem is disclosed. In a particular embodiment, the data modem aggregator system includes a plurality of data ports configured to communicate data traffic. The data traffic is carried over dedicated data twisted pair lines. The data modem aggregator system further includes shared data processing resources to process the data traffic communicated over the plurality of data ports and a high-speed multiplexed output responsive to the plurality of data ports and the shared resources.

In a particular embodiment, the method of initializing a data connection for a data modem includes detecting power-on of the data modem, handshaking from the data modem with a far end connection, negotiating a data rate with the far end connection, and communicating data between the data modem and the far end connection over a dedicated data twisted pair line. Each of the above steps in the initialization process is performed without receiving a dial tone and without dialing digits over a public switched telephone voice network.

15 Claims, 4 Drawing Sheets

DEDICATED DATA MODEM SYSTEM AND METHOD

CLAIM OF PRIORITY

This application claims priority from and is a continuation of U.S. patent application Ser. No. 10/176,234 filed Jun. 20, 2002 now U.S. Pat. No. 6,751,304, entitled "Dedicated Data Modem System and Method," by Eugene L. Edmon, Carlton L. Brown, and Christopher T. Rice and is hereby incorporated by reference in its entirety.

BACKGROUND

1. Field of the Invention

The present invention relates to systems and methods associated with data modems and data communication.

2. Description of the Related Art

Personal computer users currently have two distinct options to access the internet, dial-up modems and high-speed data connections, such as digital subscriber loop (DSL) and cable-modem services. The high-speed data connections provide faster data rates and increased performance. In addition, the high-speed data connections have an advantage of being "always on", i.e. they do not require a user to wait during the process of dialing-up and then establishing a connection to the far end data equipment, thereby leading to faster startup user access. A disadvantage of the high-speed data connections is that these services utilize more complex technology and have higher costs than dial-up modems.

It would therefore be desirable to provide a data connection service that removes the inconvenience of the dial-up process associated with dial-up modems and at a lower cost than DSL and cable-modem high-speed services. Accordingly, there is a need for improved systems and methods of providing data communications.

SUMMARY

The present invention is directed to systems and methods associated with data modems and data communication.

In a particular embodiment, a system is disclosed that includes a data modem to communicate data over a dedicated data communication twisted pair line. The modem includes a dedicated data initialization module. The dedicated data communication twisted pair line is coupled to the modem at a near end and is coupled to a data line card at a far end.

In another embodiment, the system includes a modem aggregator including a plurality of data ports configured to carry data traffic associated with dedicated remote data modems. The modem aggregator further includes shared data processing resources to process data traffic with respect to the plurality of data ports. The modem aggregator is coupled to a high-speed data connection. The system also includes a data transport packet network responsive to the modem aggregator and coupled to the high-speed data connection.

In another embodiment, the data modem aggregator system includes a plurality of data ports configured to communicate data traffic, shared data processing resources to process the data traffic communicated over the plurality of data ports, and a high-speed multiplexed output responsive to the plurality of data ports and the shared resources. The data traffic is carried over dedicated data twisted pair lines;

In another embodiment, the system includes a data modem to communicate data over a dedicated data communication twisted pair line. The data modem includes a dedicated data initialization module. The dedicated data communication twisted pair line is coupled to the modem at a near end and is coupled to a data line card at a far end. The data line card is within a digital loop carrier.

In another embodiment an apparatus is provided. The apparatus includes a data modem to communicate data over a dedicated data communication twisted pair line. The data modem includes a dedicated data initialization module and modulation front-end. The modulation front-end is configured to utilize voice-band frequencies and frequencies above the voice-band frequencies.

In another embodiment, a method of initializing a data modem connection is provided. The method includes detecting power-on of the data modem, handshaking from the data modem with a far end connection, negotiating a data rate with the far end connection, and communicating data between the data modem and the far end connection over a dedicated data twisted pair line. Each of the above steps in the initialization process is performed without receiving a dial tone and without dialing digits over a public switched telephone voice network.

In another embodiment a method of providing a data service is disclosed. The method includes coupling a dedicated data carrier line to a modem aggregator and activating a data service to be provided using the dedicated data carrier line.

BRIEF DESCRIPTION OF THE DRAWINGS

The use of the same reference symbols in different drawings indicates similar or identical items.

DESCRIPTION OF THE EMBODIMENT(S)

Figure 1:
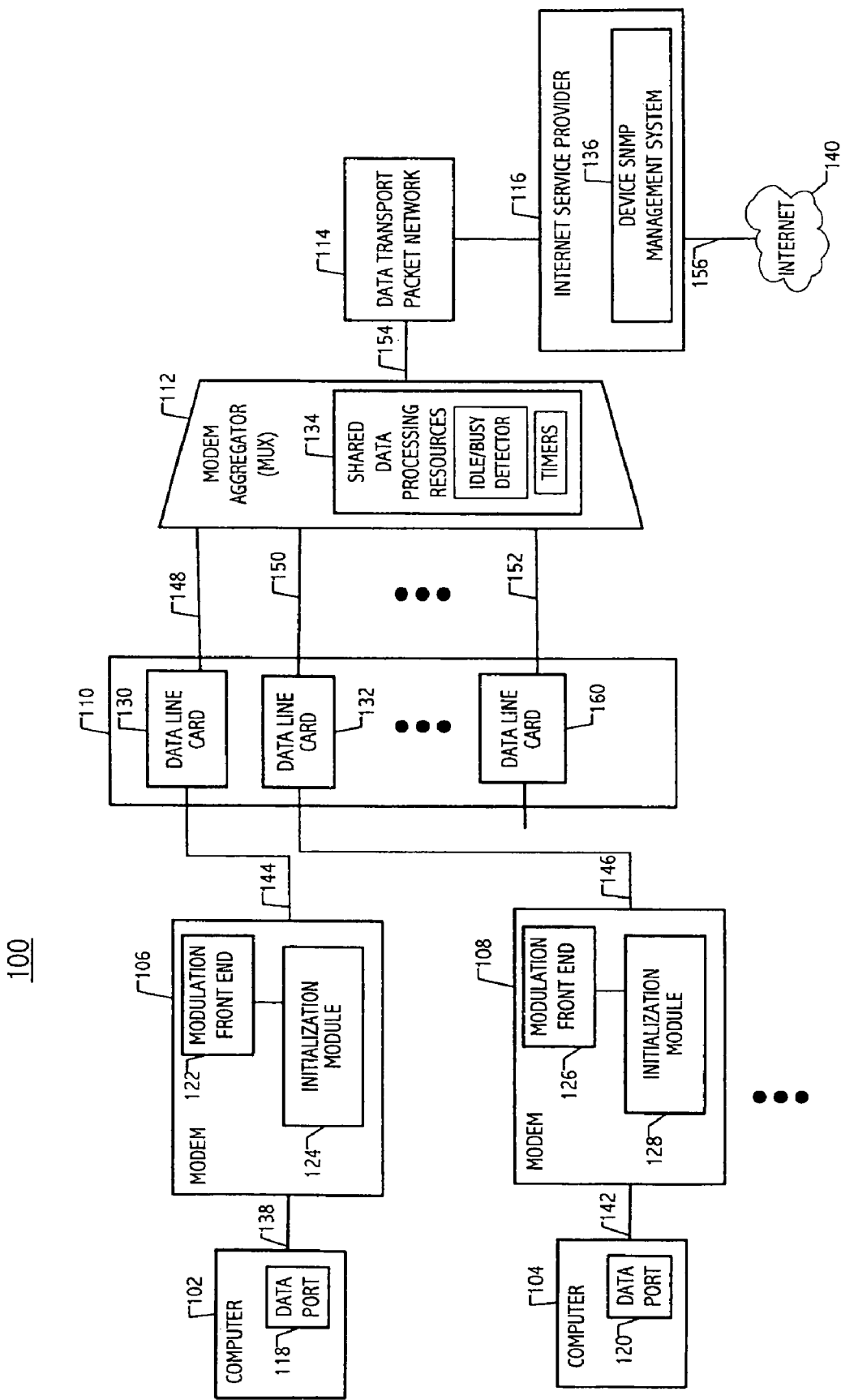
FIG. 1 is a block diagram that illustrates a system that includes dedicated data modems and a modem aggregator

Referring to FIG. 1, a system 100 is illustrated. The system 100 includes a computer 102, a data modem 106, a line card shelf 110, a modem aggregator 112, a data transport packet network 114, and an Internet service provider (ISP) 116. The computer 102 includes a data port 118 and, in a particular embodiment, is a conventional personal computer. The data modem 106 includes a modulation front-end 122 and a data initialization module 124. The data modem 106, in a particular embodiment, is a modified v.90 or v.92 type modem. The modifications to the industry-standard v.90 or v.92 modem are changes associated with the initialization module 124 and the modulation front-end 122 disclosed herein. The system 100 also includes an illustrative additional computer 104 and an additional data modem 108.

The line card shelf 110 includes a plurality of data line cards such as data line card 130, data line card 132 and data line card 160. The line card shelf 110, in a particular embodiment, is located within a telephone switch central office. The modem aggregator and multiplexer (MUX) unit 112 may include shared data processing resources 134 or may continue to utilize existing dedicated modem ports. In a particular embodiment, the shared data processing resources 134 includes shared digital signal processors (DSPs), controllers, memory (e.g. random access memory (RAM)), and network processors. Resource sharing provides for higher density in the central office (CO), leading to lower cost per customer. The Internet service provider 116 includes a device simple network management protocol (SNMP) management system 136. The Internet service provider (ISP) 116 is connected to the Internet 140. The ISP operates an SNMP manager and the modem aggregator operates an SNMP client. The SNMP manager is to control the relevant functionality of the modem aggregator to support provisioning, basic trouble shooting, and standard operation. In addition, auto-provisioning of the system may be supported by including a lightweight directory access protocol (LDAP) client at the customer end and an LDAP directory at the ISP.

The data modem 106 is coupled to computer 102 over a data connection 138. The data connection 138 may include a PCI bus connection where the modem 106 is internal to the computer 102 or may include an external data connection such as an Ethernet connection or a universal serial bus (USB). The data modem 106 is coupled via a dedicated twisted pair line 144 to the data line card 130 within the line card shelf 110. The data line card 130 is connected over data path 148 to the modem aggregator and multiplexer 112. In a similar fashion, the personal computer 104 is coupled to data modem 108 via data path 142. The second data modem 108 is coupled over a second twisted pair dedicated data line 146 to the second data line card 132. The second data line card 132 is coupled to the modem aggregator 112 via data connection 150. Although only two computers and two modems are shown, it should be understood that a plurality of different computers and different associated data modems may be coupled via additional twisted pair connections to the central office and the modem aggregator multiplexer unit 112. Also, while the modem aggregator 112 and the line card shelf 110 are shown as different units, it should be understood that both of these components may be included in a single hardware unit and in this case, the data paths 148, 150, 152 are internal data buses.

During operation, a computer user at computer 102 may request a data connection to the Internet by first making a data request over data connection 138 to the dedicated data modem 106. The data modem 106, via the initialization module 124 and the modulation front end 122, communicates hand-shaking signals and other signals necessary to communicate with data line card 130. The twisted pair line 144 is dedicated for data communication and does not provide a dial tone and does not require the data modem 106 to dial any telephone digits. Upon establishment of a data path after appropriate hand-shaking, the data modem 106 may communicate with the data line card 130, and via the modem aggregator 112, the data transport 114, and the internet service provider 116, the data modem 106 receives data access to the Internet 140.

The modem aggregator 112 communicates with a plurality of data line cards and has a plurality of data ports, such as data ports coupled to data paths 148, 150 and 152. The data paths 148, 150, and 152 provide the line cards with access to the shared resources 134 and each of the data ports may use the shared data processing resources 134. In this manner, data processing resources may be shared to lower the cost of the modem aggregator 112. In addition, the modem aggregator 112 includes idle detection elements and data transmission elements to detect an inactive or active state on the various data ports. When a particular data port is idle, that port does not need use of the shared data processing resources. In this situation, the data processing resources are re-allocated from the idle port to one or more of the active data ports.

The modem aggregator and multiplexer unit 112 can concentrate various data traffic from the plurality of data ports and provides a combined data stream for transmission over high speed data link 154. At this point, the data has been framed, processed, and formed into appropriate data packets for transmission over the data transport network 114 to the internet service provider 116. Examples of suitable packet networks include an asynchronous transfer mode (ATM) network and an internet protocol routing network. The internet service provider 116 receives the transmitted data packets from the data transport network 114 and is coupled to the Internet 140 to provide data access.

The internet service provider 116 also includes a device management system 136. The device management system 136 may be used to configure, troubleshoot and monitor the equipment at the modem aggregator 112. The device management system 136 may also be used by appropriate operations personnel to troubleshoot, configure, and perform other management operations with respect to remote data modems, such as data modem 106 and 108. In this particular embodiment, additional cost reductions are achieved by providing data management at the internet service provider 116, thereby eliminating such management operations and associated costs from the modem aggregator 112. In another embodiment, the modem aggregator 112 may include dedicated device management operations.

Figure 2:
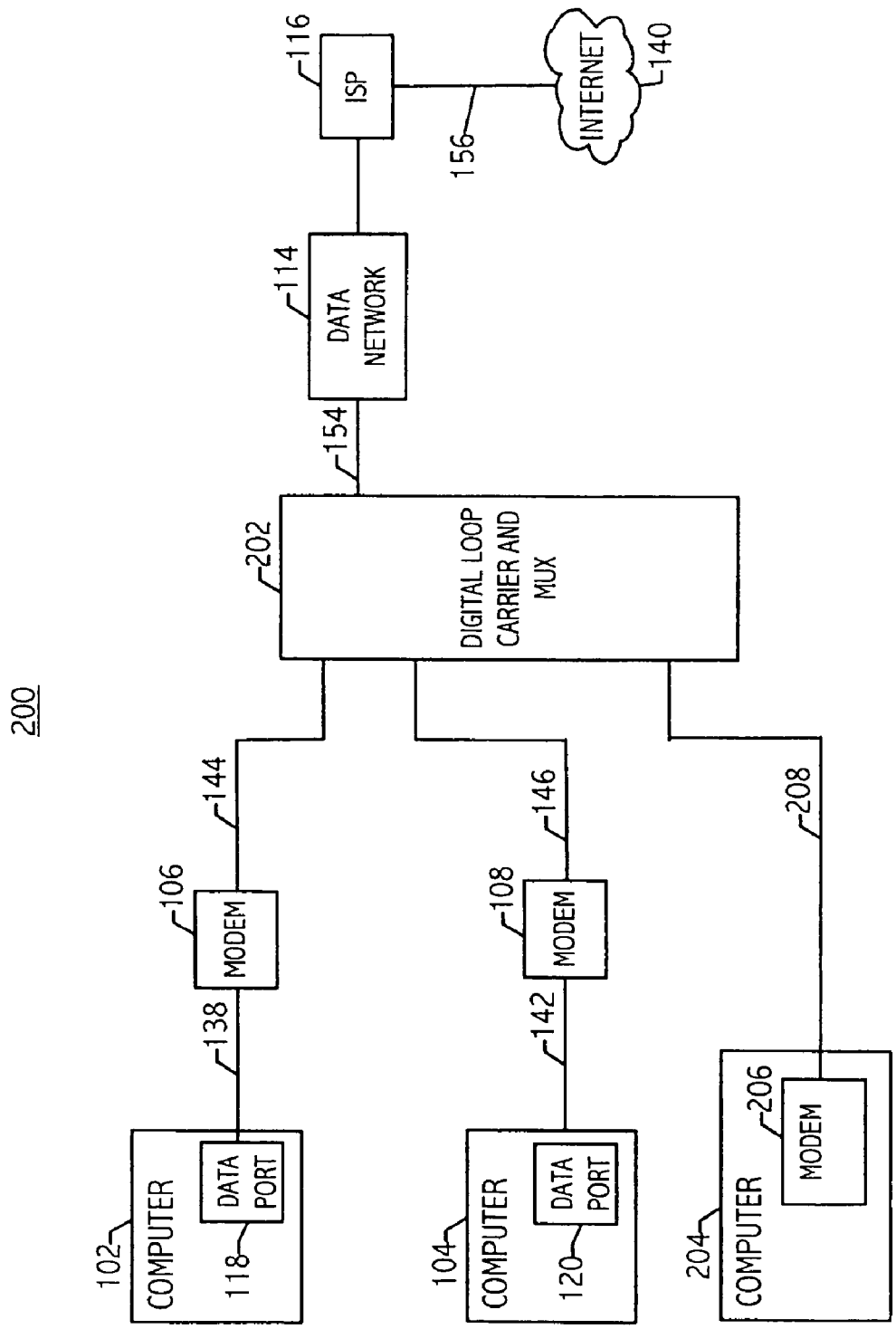
FIG. 2 is a block diagram that illustrates a system that includes dedicated data modems and a digital loop carrier.

Referring to FIG. 2, a system 200 is disclosed. The system 200 includes a plurality of computers, such as computers 102, 104 and 204, a plurality of data modems such as data modems 106, 108, and 206, and a digital loop carrier and multiplexer unit 202. The system 200 also includes data network 114 and ISP 116, which provides access to the Internet 140.

Within system 200, digital loop carrier 202 includes the modem aggregator and data line card functionality discussed with respect to FIG. 1. The digital loop carrier 202 may be located proximate to the various computer subscribers such as at a neighborhood residential development. Alternatively, the digital loop carrier 202 may be located at a business having several computer stations and data modems. The digital loop carrier 202 is coupled at one side (e.g., an input when receiving data from computers 102, 104, 204) to a plurality of twisted pair dedicated data connections and provides at its other side (e.g., its output) a high speed multiplexed data communication capability. The digital loop carrier is coupled to the data network 114 and internet service provider 116 using high speed data connections to handle remote data transmission over link 154. The digital loop carrier 202 also includes shared data processing resources for various data ports.

The digital loop carrier unit 202 may conveniently and cost-effectively provide dedicated data connections to subscribers. For example, by using a digital loop carrier 202, a single long distance communication line, such as a fiber optic link from the data network 114 to the digital loop carrier 202 may reduce the cost of adding additional twisted pair lines since the relative distance between the digital loop carrier 202 to the various computers 102, 104, and 204 is of short length. This is illustrated in an embodiment where the digital loop carrier 202 is located within a residential neighborhood and the computers 102, 104, and 204 are located within residences of the neighborhood. In this case, the data link 154 may be a previously installed and provisioned communication line.

Figure 3:
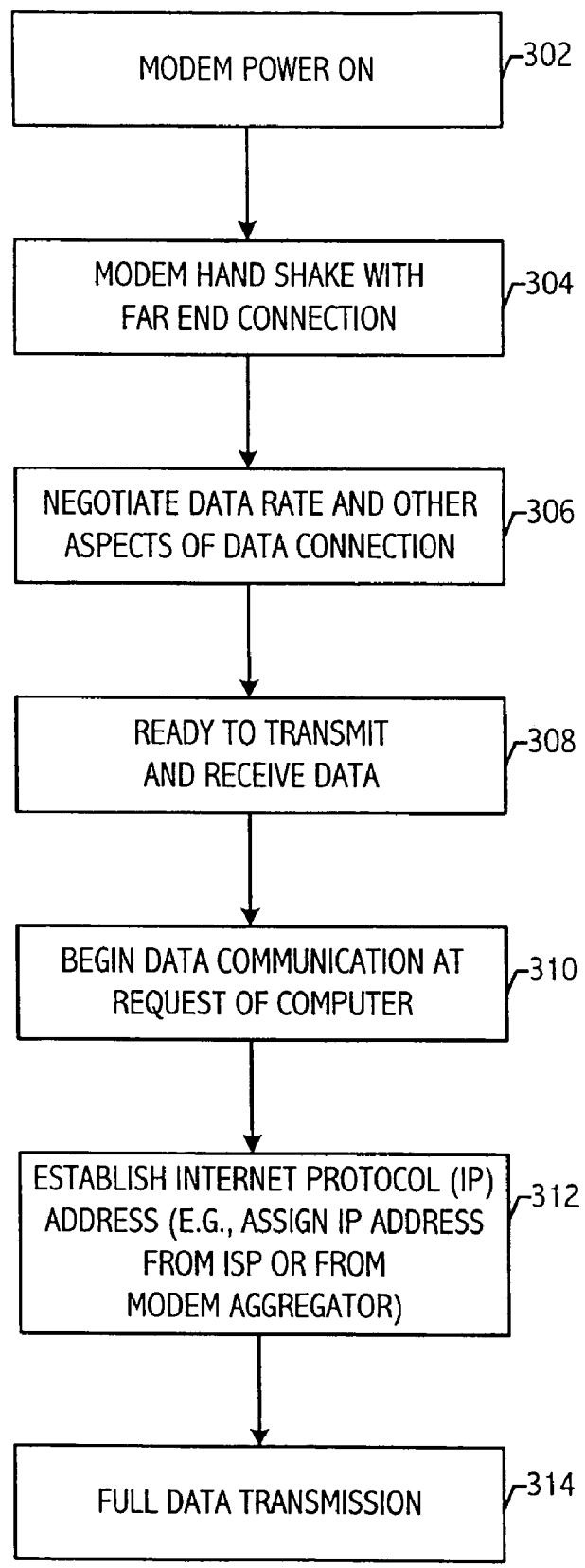
FIG. 3 is a flow chart that illustrates a method of initializing a data modem.

Referring to FIG. 3, a method of initializing a data modem connection is illustrated. With this method, a first step is where the data modem is powered on, at 302. Upon power on, the data modem proceeds to execute a hand-shake procedure with the far end connection, at 304. The data modem and the far end negotiate an appropriate data rate and other aspects of the data connection, at 306. A this point, the data modem is ready to transmit and receive data, at 308, and data communication begins upon request of the computer user, at 310. At 312, an internet protocol (IP) address is established and assigned to the subscriber. The IP address may be assigned either from the ISP location or from the modem aggregator unit 112. When modems 106, 108 and/or 206 are configured for "always-on" operating, (generally on power cycle reassignment of the IP address is required). Upon IP address assignment, full data transmission may occur, at 314.

The data modem initialization method avoids many of the inconveniences and extra steps associated with conventional dial up modems. For example, with a conventional dial up modem, the steps of sending an off hook signal, receiving a dial tone, dialing telephone numbers, waiting for routing and connections to occur, and receiving a far end answer signal are all necessary steps prior to establishing the dial-up data connection. In addition, the dial up modem also needs to send modem tones so that the data equipment can recognize a subsequent data communication as opposed to a voice connection. In the disclosed embodiment, since the data modem is dedicated for data communication, does not provide for a voice path, and does not utilize a dial up procedure, the dedicated data initialization method provides for faster startup access for the computer user to use data resources such as the Internet.

Figure 4:
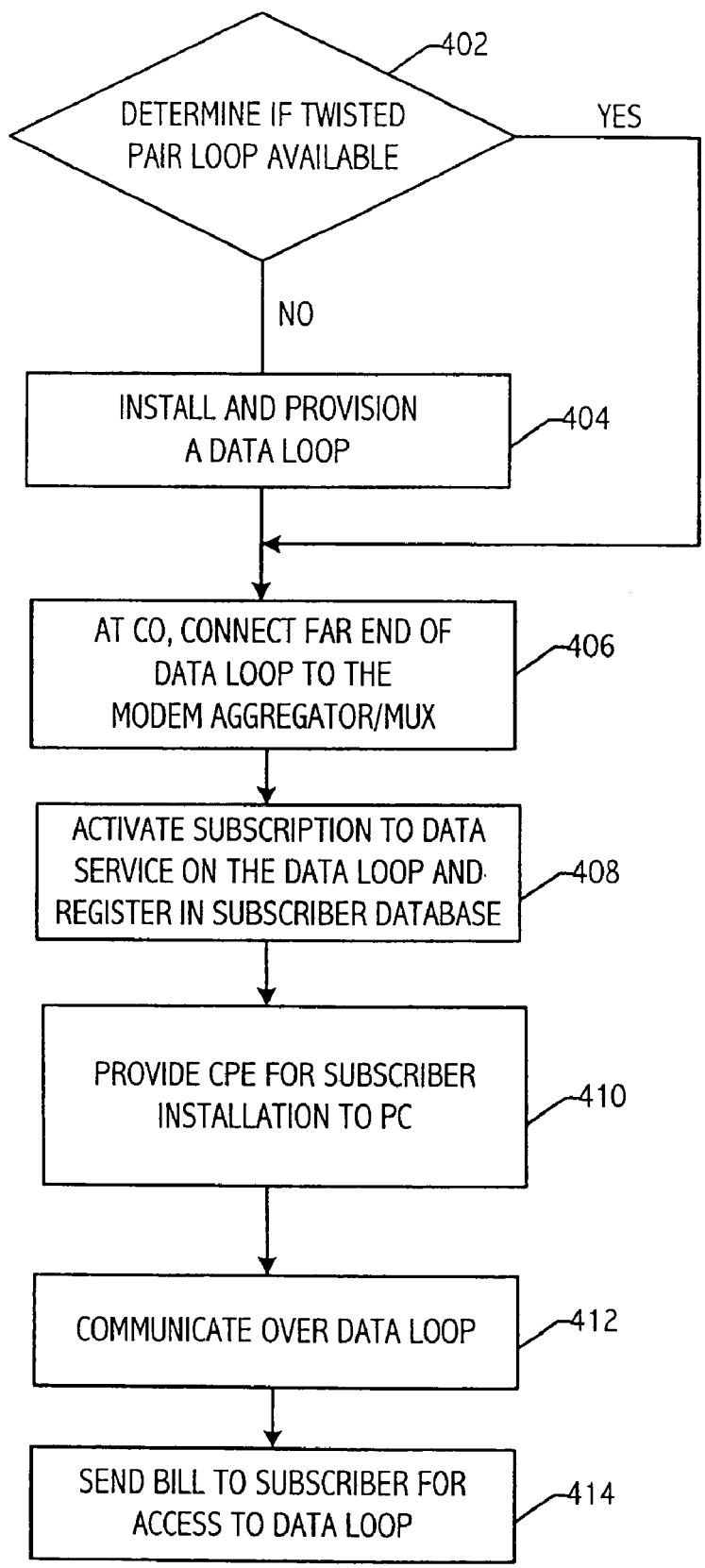
FIG. 4 is a flow chart that illustrates a data modem service.

Referring to FIG. 4, a method of providing a data service is illustrated. A determination is made whether a twisted pair loop is available, at 402. If a twisted pair loop is not available, then a new twisted pair loop is installed and provisioned as a dedicated data loop, at 404. If a twisted pair loop is available, then the available twisted pair is used as the dedicated data loop and processing continues, at step 406. At this point, the dedicated data loop is coupled to the modem aggregator and multiplexer unit. A subscription to the data service is activated on the dedicated data loop and the subscription information for a particular subscriber is registered within a subscriber database, at 408.

Customer premise equipment (CPE), such as the data modem 106, is then provided to the subscriber. The subscriber installs the data modem by connecting the modem to a computer, at 410. The installation process may be a self-install process or may utilize a technician to make the connection. The data modem is also connected to the dedicated data loop. Upon a connection, communication occurs over the dedicated data loop, at 412. With the data service established, a service provider may send a bill, typically on a monthly basis, to the subscriber for providing access via the data loop, at 414.

Thus, an improved data service over a dedicated data carrier line is provided. The data service offers a low-cost alternative to high-speed data lines such as DSL and cable modem technology and offers advantages over traditional dial-up modems. In particular, the dedicated data modem and data connection offers "always on" service and avoids delays of the traditional dial-up process over PSTN telephone line.

The above disclosed subject matter is to be considered illustrative and the appended claims are intended to cover all such modifications and other embodiments which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A system comprising:
    a modem aggregator including a plurality of data ports configured to carry data traffic associated with dedicated remote data modems that do not provide for a voice path, the modem aggregator further including shared data processing resources to process data traffic with respect to the plurality of data ports, the shared data processing resources include an idle detection element to determine when a particular data port is idle; and
    a data transport packet network responsive to the modem aggregator and coupled to a high-speed data connection, wherein the data transport packet network is coupled to an internet service provider.

2. The system of claim 1, wherein the internet service provider includes a device management system, the device management system to provide device management for the modem aggregator.

3. The system of claim 2, wherein device management includes operations selected from the group consisting of troubleshooting, configuration, and monitoring.

4. The system of claim 2, wherein the internet service provider provides internet protocol address assignments for originating modems communicating with the plurality of data ports at the modem aggregator.

5. The system of claim 1, further comprising a data line termination unit, the data line termination unit including a plurality of data line cards, each of the plurality of data line cards associated with a remote modem and associated with one of the plurality of data ports within the modem aggregator.

6. The system of claim 1, wherein the shared data processing resources include a data transmission detection element to determine when a previously idle data port is communicating data.

7. The system of claim 1, wherein the shared data processing resources further include watchdog timers.

8. The system of claim 1, wherein shared data processing resources are applied to data ports that are active and are not applied to data ports where an idle condition is detected by the idle detection element.

9. The system of claim 8, wherein the shared data processing resources include shared digital signal processors.

10. A system comprising:
    a modem aggregator including a plurality of data ports configured to carry data traffic associated with dedicated remote data modems, the modem aggregator further including shared data processing resources to process data traffic with respect to the plurality of data ports; and
    a data transport packet network responsive to the modem aggregator and coupled to a high-speed data connection, wherein the data transport packet network is coupled to an internet service provider;
    wherein the shared data processing resources include an idle detection element to determine when a particular data port is idle and a data transmission detection element to determine when a previously idle data port is communicating data.

11. The system of claim 10, wherein the shared data processing resources further includes watchdog timers.

12. The system of claim 10, wherein shared data processing resources are applied to data ports that are active and are not applied to data ports where an idle condition is detected by the idle detection element.

13. The system of claim 12, wherein the shared data processing resources include shared digital signal processors.

14. A system comprising:
  a modem aggregator including a plurality of data ports configured to carry data traffic associated with dedicated remote data modems that do not provide for a voice path, the modem aggregator further including shared data processing resources to process data traffic with respect to the plurality of data ports, the shared data processing resources include a data transmission detection element to determine when a previously idle data port is communicating data; and
  a data transport packet network responsive to the modem aggregator and coupled to a high-speed data connection, wherein the data transport packet network is coupled to an internet service provider.

15. The system of claim 14, wherein the shared data processing resources include an idle detection element to determine when a particular data port is idle.

* * * * *